3,207,728
POLYIMIDES FROM THIOPHENE TETRACARBOXYLIC ACID AND DIAMINES
Dale C. Blomstrom, Wilmington, Del., assignor to E. I. du Pont de Nemours and Company, Wilmington, Del., a corporation of Delaware
No Drawing. Filed Mar. 31, 1961, Ser. No. 99,681
5 Claims. (Cl. 260—78)

This invention relates to polyimides of thiophene tetracarboxylic acid and selected diamines.

Thiophene tetracarboxylic acid has an unusual structure, i.e., it is a cyclic sulfide having a carboxylic group attached to each nuclear carbon, which in turn is attached to another nuclear carbon by a carbon-to-carbon double bond. The new compound is a white crystalline material melting at about 260° C. It is soluble in water.

The known polyimides of tetracarboxylic acids are generally tough and high melting, see Br. 570,858, U.S. 2,710,853, and 2,731,447 and thus are of substantial interest in the preparation of fibers and molded objects. In this regard, the polyimides obtained by reaction of a diamine with thiophene tetracarboxylic acid are of particular utility.

The polyimides of the invention are prepared by those prior art techniques generally employed for the preparation of polyimides. The diamine and thiophene tetracarboxylic acid are contacted, preferably in an inert solvent, at a temperature of 100–300° C. Stepwise heating up to the desired maximum temperature is preferred because it promotes the formation of high molecular weight polyimides. Reaction time will, of course, depend upon the temperature employed, with substantial quantities of polyimide being produced in about thirty minutes at the higher temperatures in the above range.

Useful diamines for the preparation of polyimides are those having 2–12 carbons between primary amino groups and preferably having four or more methylene groups, e.g., hexamethylenediamine, octamethylenediamine, decamethylenediamine, and dodecamethylenediamine. Also useful are ethylenediamine, m- and p-phenylenediamine, 1,4-diaminocyclohexane, etc.

The following further illustrates the preparation of polyimides of this invention. Example I illustrates the preparation of thiophene tetracarboxylic acid.

*Example I–A*

Tetracyanothiophene was prepared by the following sequence of reactions: To a stirred and cooled (0–10° C.) suspension of 22.2 parts of 1,2-dicyano-1,2-disodiothioethylene (obtained from the reaction product of sodium cyanide and carbon disulfide as described by Bahr and Schleitzer, Ber. 90, 438 (1957) in 350 parts of dimethoxyethane was added 17.4 parts of dichloromaleonitrile. After 72 hours at room temperature the solids were removed by filtration and the filtrate evaporated to dryness. The residue was extracted by warm benzene and later recrystallized from hot benzene to give 1,4-dithia-2,3,5,6-tetracyanocyclohexa-2,5-diene, M.P. 207–208°. Heating of this compound for 15 minutes at 210–220° C. in a glass tube resulted in the loss of sulfur by sublimation. Extraction of sulfur by carbon bisulfide and sublimation gave 80% yield of pure tetracyanothiophene, M.P. 198° C.

*Example I–B*

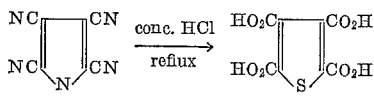

Five grams of the tetracyanothiophene prepared in Example I–A was refluxed in 100 ml. of concentrated hydrochloric acid for eight hours. The solution was cooled to 0° C. and the crystalline solid was removed by filtration and pressed as dry as possible on the filter. A solution of the product in 125 ml. of water was passed through a 2 x 30 cm. column of 80 g. of nuclear sulfonic acid-type cation-exchange agent ("Amberlite IR 120") at a rate of 5 ml./min., i.e., retention time was 7–8 minutes, and the column flushed with distilled water. The eluate was evaporated to dryness in vacuo and the material was recrystallized from boiling water. A yield of 3.75 g. (53%) of hard white needles of thiophene tetracarboxylic acid was obtained with a melting point of 260–261° C. (dec.). The sample was dried three hours at 118° C. for analysis.
*Analysis.*—Calcd. for $C_8H_4O_8S$: C, 36.92; H, 1.54; N, 0; N.E., 65.0. Found: C, 36.97; H, 1.80; N, 0; N.E., 65.8. The infrared spectrum was consistent with the thiophene tetracarboxylic acid structure.

The new acid is a crystalline material having a relatively high melting point.

*Example II*

A total of 3.9 g. of thiophene tetracarboxylic acid in 10 ml. of ethanol (inert solvent) is charged into a tube containing 3 g. of 2,11-diaminododecane. To this is added 10 ml. of water and the tube heated under an atmosphere of nitrogen successively at 110, 140, 200, and 280° C. for 30–60 minutes each. The final heating is conducted under reduced pressure to remove condensed water from the tube leaving the polymer product.

Polyimides thus obtained are relatively high melting polymers of good stability. They are useful for the preparation of tough fibers and molded objects by the methods generally employed in the polyamide and polyimide art.

Since obvious modifications and equivalents in the invention will be evident to those skilled in the chemical arts, I propose to be bound solely by the appended claims.

The embodiments of the invention in which an exclusive property or privilege is claimed are defined as follows:

1. A solid polyimide of thiophene tetracarboxylic acid and a diamine having between primary amino groups a 2 to 12 carbon atom group which may be selected from a group consisting of alkylene, monocycloalkylene and phenylene.

2. A solid polyimide of thiophene tetracarboxylic acid and a diamine having the two —$NH_2$ groups separated solely by 2–12 methylene groups.

3. A solid polyimide of claim 2 wherein the two —$NH_2$ groups of the diamine are bonded to different terminal methylene groups.

4. A solid polyimide of thiophene tetracarboxylic acid and 2,11-diaminododecane.

5. A fiber composed of a solid polyimide of claim 1.

References Cited by the Examiner

UNITED STATES PATENTS

| | | | |
|---|---|---|---|
| 2,710,853 | 6/55 | Edwards et al. | 260—78 |
| 2,801,908 | 8/57 | Middleton | 260—332.2 |
| 2,922,795 | 1/60 | Blicke | 260—332.2 |
| 2,972,603 | 2/61 | Cislak | 260—79 |
| 2,973,345 | 2/61 | Smith et al. | 260—79 |
| 3,053,853 | 9/62 | Vest | 260—78 |

WILLIAM H. SHORT, *Primary Examiner.*

M. C. McKUTCHEN, LOUISE P. QUAST, *Examiners.*

UNITED STATES PATENT OFFICE
CERTIFICATE OF CORRECTION

Patent No. 3,207,728　　　　　　　　　　　　　　September 21, 1965

Dale C. Blomstrom

It is hereby certified that error appears in the above numbered patent requiring correction and that the said Letters Patent should read as corrected below.

Column 1, lines 68 to 70, for the left-hand portion of the equation reading

　　　read　　　

Signed and sealed this 25th day of October 1966.

(SEAL)
Attest:

ERNEST W. SWIDER
Attesting Officer

EDWARD J. BRENNER
Commissioner of Patents